United States Patent [19]

Falk

[11] 4,075,289
[45] Feb. 21, 1978

[54] CHLORINATED, HYDROGENATED POLYBUTADIENE IMPACT MODIFIERS FOR PVC

[75] Inventor: John Carl Falk, Chicago, Ill.

[73] Assignee: Borg-Warner Corporation, Chicago, Ill.

[21] Appl. No.: 743,825

[22] Filed: Nov. 22, 1976

[51] Int. Cl.² ............................ C08F 8/22; C08F 8/04
[52] U.S. Cl. ...................................... 260/890; 526/20; 526/21; 526/25; 526/26; 526/43
[58] Field of Search .................... 260/890; 526/25, 26, 526/20, 21

[56] References Cited

U.S. PATENT DOCUMENTS

| 3,431,323 | 3/1969 | Janes | 260/880 |
| 3,467,732 | 9/1969 | Schnebelen et al. | 260/890 X |
| 3,483,275 | 12/1969 | Waterman et al. | 260/890 |
| 3,652,517 | 3/1972 | Yoshimoto et al. | 526/25 |

Primary Examiner—William F. Hamrock
Attorney, Agent, or Firm—Richard J. Schlott

[57] ABSTRACT

High-vinyl polybutadiene, when fully hydrogenated and then photo-chlorinated to a level of 15 to 40 wt% chlorine, is an impact modifier for PVC. Blends with PVC have high impact, good flow properties and are weatherable.

3 Claims, No Drawings

CHLORINATED, HYDROGENATED POLYBUTADIENE IMPACT MODIFIERS FOR PVC

BACKGROUND OF THE INVENTION

This invention relates to weatherable polymeric flow and impact modifiers for PVC resin, and to PVC compositions. More particularly, the invention relates to chlorinated hydrogenated high-vinyl polybutadiene and rubbery copolymers thereof, which are useful as modifiers for PVC to impart improved flow, impact, and weathering properties thereto, and to PVC compositions having improved flow, impact and weathering properties.

Polyvinyl chloride (PVC) resins are commonly fabricated from powders or pellets by thermal processes including extrusion and injection molding, during which the particles must be fused into a molten mass. In conventional processing, the fusion and subsequent processing is aided by incorporation of plasticizers. These plasticizers also improve the flow and shear characteristics of the PVC resins by reducing the melt viscosity, thus enhancing the overall processability. Plasticizers, however, are not entirely satisfactory for many purposes inasmuch as they materially reduce the rigidity and heat distortion temperature of the resin when employed in amounts sufficient to improve processability.

Methods for improving impact properties of PVC have included blends of PVC with a second polymeric resin. The second polymeric resin may be a graft copolymer such as for example an ABS or MBS resin. Many polymeric impact modifiers, however, exhibit poor weathering properties, and blends of these with PVC deteriorate rapidly when exposed to ultra violet rays during outdoor use. Impact modifiers having improved weathering characteristics include those prepared by graft-polymerizing methyl methacrylate monomers in the presence of rubbery substrates such as those found in U.S. Pat. No. 3,264,373, and graft copolymers of mixtures of acrylic ester monomers with styrene on rubbery substrates such as those disclosed in U.S. Pat. No. 3,886,232. Although these and related materials exhibit good weathering properties, they require the including of high cost acrylate monomers and are prepared by multi-step polymerization processes which further increase the cost and complexity of their preparation. It is desirable, therefore, to provide alternative, potentially lower cost impact modifiers which can be blended with a PVC resin to improve the impact properties and processability of the resin without materially reducing the weather resistance of the product composition.

SUMMARY OF THE INVENTION

It has now been found that particular hydrogenated and chlorinated polybutadiene impact modifier resins, when blended with PVC resins, impart a major improvement in flow and impact properties without a marked reduction in weather resistance. More particularly, resins prepared by chlorinating rubbery substrates of hydrogenated 1,2-polybutadiene or copolymer thereof impart excellent flow properties and impact properties to PVC resins, resulting in processable compositions which exhibit improved weathering resistance.

DETAILED DESCRIPTION

The impact modifier resins of this invention are prepared by chlorinating a rubbery substrate of hydrogenated 1,2-polybutadiene.

The rubbery substrate is a polymer or copolymer of butadiene having greater than 40% of the butadiene monomer units in the form of 1,2-polymerized units which is prepared and hydrogenated by conventional processes. As is well known, 1,3-butadiene monomer may be polymerized by a variety of techniques to give polymers having a high proportion of units having 1,4 attachment. Certain commercial techniques based on anionic polymerization technology are also well known whereby the 1,3-butadiene may be polymerized through the 1,2 positions to give polymers having a high level of units having 1,2 attachment. Such polymers can be produced in a variety of molecular weight ranges with varying proportions of 1,2- to 1,4-units and may also include additional vinyl monomers. For purposes of the invention, the preferred substrate materials are those having molecular weights between 25,000 and 500,000 more preferably between 50,000 and 250,000 and which contain not less than 30% and preferably at least 40% 1,2-polymerized butadiene units. Polymers having lower molecular weights are uneconomical while substrates having a molecular weight greater than about 500,000 are difficult to handle in subsequent chlorination and blending steps. A high level of 1,2-content is especially important to the properties of the final product, since as will be further described below, the substrates are to by hydrogenated. As is known in the art, polybutadienes which are primarily made up of 1,4-polymerized units give polyethylene-like, non-rubbery materials when the unsaturation is removed by hydrogenation. The rubbery character of the hydrogenation product increases with high levels of 1,2-polymerized units, and becomes quite rubbery when the major portion of the structure is the 1,2-unit. Well known, commercially useful techniques exist for the production of polybutadienes having greater than about 60%, often above 70%, of the monomer units in the 1,2-polymerized form. Polymers produced by these processes are generally useful in that the hydrogenation products exhibit sufficiently rubbery characteristics for the purpose of this invention.

Rubbery copolymers including both random and block copolymers of butadiene containing 1,2 polymerized butadiene together with up to 60% of a second vinyl monomer such as styrene, vinyl toluene and the like, when hydrogenated to remove the ethylenic unsaturation, are also useful for the purposes of this invention. The presence of the vinyl (1,2) monomer units is again necessary to impart a rubbery character to the subsequent hydrogenation product.

Hydrogenation of the rubbery substrate may be carried out by a variety of well-established processes, including hydrogenation in the presence of such catalysts as Raney Nickel, noble metals such as platinum, palladium and the like or the "soluble" transition metal catalysts. The preferred process is one wherein the butadiene-containing substrate is dissolved in an inert hydrocarbon diluent such as cyclohexane and hydrogenated by reaction with hydrogen in the presence of a soluble hydrogenation catalyst such as is disclosed in U.S. Pat. No. 3,133,986. These and similar low pressure hydrogenation processes are rapidly and conveniently carried out to give virtually complete removal of aliphatic unsaturation from the butadiene portion of polymeric substrates. In the practice of the instant invention, the hydrogenation is carried out until no aliphatic unsaturation remains insofar as can be detected by ordinary infrared spectroscopic techniques. The technique employed for the preparative examples suffices for detecting levels of unsaturation greater than about 0.1–0.2% by weight, corresponding to one c=c group in 1,000 to 2,000 carbon atoms.

The hydrogenated butadiene polymers are then photo-chlorinated to produce the impact modifiers of this invention. The photo-chlorination of the polymers may be carried out by any of the conventional photo-chlorination processes, and may conveniently be accomplished by dissolving the polymer in a chlorinated solvent such as carbon tetrachloride, then irradiating the solution with UV light while passing chlorine gas through the solution until the desired level of chlorination has been achieved. The preferred level of chlorination will be from about 15 wt% to about 40 wt%, more preferably from about 20 wt% to about 35 wt% based on final polymer compositions. At chlorine contents below this range, the polymers are relatively incompatible with PVC and therefore are poor impact modifiers, while at higher chlorine contents, above the preferred range, the resulting modifiers are rigid and lack sufficient rubber character to be good impact modifiers even though compatable with PVC.

The impact modifiers of this invention and the processes for their preparation will be better understood by consideration of the following examples, which are provided by way of illustration.

EXAMPLE 1

PREPARATION AND HYDROGENATION OF 1,2-POLYBUTADIENE

A beverage bottle was charged with 700 ml. of cyclohexane, degassed, sealed, then pressurized with dry nitrogen. A hypodermic syringe needle was inserted through the seal, and 30.0 grams (0.56 moles) of butadiene-1,3 -monomer, followed by 0.33 m. moles of N,N,N',N'-tetramethylethylene diamine and 0.3 m. moles of sec-butyl lithium (0.1 M. in cyclohexane). The bottle was then placed in a water bath at 50° C. and maintained for 16 hours. An aliquot of the mixture was removed after quenching with isopropanol, from which it was determined that the polybutadiene had $\eta = 1.63$ (toluene, 25° C.) and a microstructure corresponding to 69% content of 1,2-polymerized units.

Hydrogenation of the polybutadiene was carried out on the above polymer solution after diluting with dry cyclohexane to a concentration of 30 g/liter of solution.

A two-liter stirred reactor was charged with 1500 ml. of the above cyclohexane solution of 1,2-polybutadiene, together with 0.3 mole percent (based on double bonds) of a "soluble cobalt" catalyst.

"Soluble cobalt" catalysts may be prepared by adding 8.5 g. of a cobalt (II) octoate solution containing 12.0 weight percent cobalt over a period of 90 minutes to 287 ml. of a cyclohexane solution containing 0.0854 moles of n-butyl lithium. The product is a 0.285 m. solution of "soluble cobalt" catalyst having a Li/Co ratio of 5.0/1. An alternative preparation of "soluble cobalt" catalysts involves the addition of 23.6 g. of cobalt (II) octoate solution over a period of 90 minutes to a solution of 18.8 g. of triethyl aliuminum in 494.6 g. of cyclohexane. The product is a 0.081 M solution of soluble cobalt catalyst having a 3.45/1 Al/Co ratio.

The hydrogenation reaction was maintained at 50° C. and hydrogen gas was bubbled into the reactor at 50 psi until no detectable unsaturation remained as determined for an aliquot sample by infrared analysis. The mixture was then removed from the reactor, extracted with dilute aqueous acid to remove catalyst residues, coagulated by pouring into isopropanol, collected and dried at 40° C. in a vacuum oven.

EXAMPLE 2

PREPARATION AND HYDROGENATION OF A COPOLYMER RUBBER SUBSTRATE

A styrene 1,2-polybutadiene rubber was prepared by anionic polymerization of a mixture of 25 parts styrene and 75 parts 1,3-butadiene substantially as shown in U.S. Pat. No. 3,598,886. The rubbery product was hydrogenated by the method of Example 1 to provide a hydrogenated rubber having no detectable unsaturation.

EXAMPLE 3

CHLORINATION OF HYDROGENATED 1,2-POLYBUTADIENE

A solution containing 200 gm. of the hydrogenated 1,2-polybutadiene prepared in Example 1 dissolved in 3800 ml. of carbon tetrachloride was dispersed in 7000 ml. of water. The mixture was stirred continuously at room temperature, and chlorine gas was passed into the mixture through a gas dispersion tube at the rate of 1.0 to 1.5 g/min. while the mixture was being irradiated by UV radiation from a low pressure mercury lamp. Stirring was continued at room temperature for 30 min. after the chlorine had been added.

The reaction mixture was poured into twice its volume of methanol to precipitate the polymer. The polymer was collected, washed with methanol and dried en vacuo at 60° C for 16 hr. The resulting chlorinated resin had 21% Cl, by elemental analysis.

EXAMPLE 4

CHLORINATION OF HYDROGENATED STYRENE-BUTADIENE COPOLYMER RUBBER

The copolymer rubber of Example 2 was chlorinated following the procedure of Example 3, to give a product having 20% chlorine by elemental analysis. The product was a soft rubbery material with a tensile strength of 790 psi and elongation of 340%.

EXAMPLE 5

CHLORINATED, HYDROGENATED STYRENE-BUTADIENE COPOLYMER RUBBER

The second styrene-butadiene copolymer rubber was prepared and hydrogenated as in Example 2, then chlorinated by the process of Example 3 to give a product having 35% chlorine by elemental analysis. The product was a rigid material having a tensile strength of 4970 psi and an elongation of 10%.

The PVC resin employed may be any of the conventional extrusion and injection molding PVC resins, including vinyl chloride polymers and copolymers wherein the major component of the resin is vinyl chloride. The blends of PVC with the impact modifiers of this invention will comprise from about 5 to about 20 wt% of impact modifier and correspondingly from about 95 to about 80 wt% of PVC. The blends may be further compounded to include stabilizers, pigments, lubricants and the like.

The following examples illustrate the preparation of blends typical of this invention. All blends shown were prepared by a standard procedure in which the following masterbatch formulation, in combination with the indicated amount of impact modifier, was mill-mixed at 360° F. for 10 minutes, then a portion was compression molded at 450° F. for 4 to 10 minutes to provide test specimens.

EXAMPLE 6.

PVC MASTERBATCH FORMULATION

| MATERIAL | Tradename and Source | Parts by Weight |
|---|---|---|
| PVC | Geon 93, B. F. Goodrich Chemical Co. | 100 |
| Processing Aid | Acrylic K120N, Rohm and Haas. Co. | 2.0 |
| Tin Stabilizer | Mark 1414A, Argus Chemical Corp. | 2.0 |
| Lubricant | Hoechst Wax E, Farbwerke Hoechst, AG | 0.4 |
| Lubricant | Aldo MS, Glyco Chemicals, Inc. | 0.9 |
| Toner | | 0.075 |

The chlorinated resins used as modifiers were prepared in accordance with Examples 3–5. The physical properties of the blends are shown in Table I.

TABLE I

| Ex- No. | Impact Modifier Ex. No. | wt % | Tensile Strength, Psi | E % | Izod[1] Impact | Flow[2] cc/10 min. |
|---|---|---|---|---|---|---|
| 6 | — | 0 | 1930 | 60 | 0.4 | 8.7 |
| 7 | 3 | 15 | 4970 | 120 | 11.5 | 8.5 |
| 8 | 4 | 15 | 5520 | 170 | 9.4 | 34 |
| 9 | 5 | 15 | 5620 | 70 | 6.0 | 30 |

Notes:
[1]Izod Impact, ft lbs/in notch at 73° F.
[2]Flow by Monsanto Capillary rheometer at 375° F, with 20/1 L/D capillary, 140 psi.

It will be apparent from a comparison of the impact data for blend compositions 7–9 with that of the control (unmodified PVC) Example 6 that the chlorinated, hydrogenated rubber materials of this invention impart a marked improvement in impact to PVC. Further, where the impact modifier is a copolymer (Examples 8 and 9) substantial improvement in flow properties results.

The impact modifiers of this invention thus impart both a marked increase in impact resistance and a significant improvement in flow properties to PVC blends.

The PVC compositions of Examples 6 and 7 were molded into test plaques and each was exposed on both sides to UV radiation in a UV chamber. As controls, equivalent blends with chlorinated polyethylene and with a commercial ABS PVC impact modifier were also prepared, molded and tested in the UV chamber. The weathering data for each are reported in Table 2, below.

TABLE II

| Ex. NO. | Impact Modifier Ex. No. | Wt % | color change 1 day | color change 2 days | ΔE in[3] 7 days | ΔE in[3] 14 days | ΔE in[3] 28 days | 42 days |
|---|---|---|---|---|---|---|---|---|
| 6 | — | 0 | 18.5 | 20.2 | 27.4 | 50.2 | 73.9 | — |
| 7 | 3 | 15 | 12.3 | 18.2 | 26.9 | 35.3 | 44 | 44 |
| 10 | CPE[1] | 15 | 47.9 | 47.2 | 50.6 | 55.1 | 59.9 | 64 |

Note
[1]Chlorinated polyethylene, CPE 3614, from Dow Chemical Co.
[2]Modified Adams chromatic value system. See L. Glasser and D. Troy, Journ. of the Optical Society 42 652 (1952).

Thus it will be apparent that blends employing the impact modifier of this invention (Example 7), perform generally better in accelerated weathering testing than PVC without modifier (Example 6) as determined by color change. Further, a blend with the commercial impact modifier, Example 10, rapidly deteriorated in the accelerated weathering test, as compared with the blend composition of this invention, Example 7.

The invention will thus be seen to be polymeric impact modifiers for PVC which are chlorinated, hydrogenated 1,2-polybutadiene and styrene 1,2-polybutadiene copolymers, and PVC blends containing from 3 to 20 parts by weight of these chlorinated hydrogenated impact modifiers.

I claim:

1. A thermoplastic composition comprising a blend of from about 95 to about 80 wt% of polyvinyl chloride and correspondingly from about 5 to about 20 wt% of a chlorinated polymer, said polymer being a fully hydrogenated polymer selected from the group consisting of hydrogenated homopolymers of 1,3-butadiene having greater than 30% 1,2-polymerized units and hydrogenated copolymers thereof containing up to 60 wt% styrene, said chlorinated polymer containing from 15 to 40 wt% chlorine.

2. The thermoplastic composition of claim 1 wherein the hydrogenated polymer contains greater than 60% 1,2 polymerized units.

3. The thermoplastic composition of claim 2 wherein the chlorinated polymer contains from 20 to 35 wt% chlorine.

* * * * *